(12) United States Patent
Zadeh et al.

(10) Patent No.: US 11,038,905 B2
(45) Date of Patent: Jun. 15, 2021

(54) IDENTIFYING ATTACK BEHAVIOR BASED ON SCRIPTING LANGUAGE ACTIVITY

(71) Applicant: Splunk, Inc., San Francisco, CA (US)

(72) Inventors: Joseph Auguste Zadeh, Sunnyvale, CA (US); Rodolfo Soto, Miramar, FL (US); Madhupreetha Chandrasekaran, Sunnyvale, CA (US); Yijiang Li, Sunnyvale, CA (US)

(73) Assignee: SPLUNK, INC., San Francisco, CA (US)

( * ) Notice: Subject to any disclaimer, the term of this patent is extended or adjusted under 35 U.S.C. 154(b) by 51 days.

(21) Appl. No.: 15/415,853

(22) Filed: Jan. 25, 2017

(65) Prior Publication Data

US 2018/0212985 A1 Jul. 26, 2018

(51) Int. Cl.
*H04L 29/06* (2006.01)
(52) U.S. Cl.
CPC ...... *H04L 63/1425* (2013.01); *H04L 63/1441* (2013.01); *H04L 2463/121* (2013.01)
(58) Field of Classification Search
CPC ............. H04L 63/1425; H04L 63/1441; H04L 2463/121
See application file for complete search history.

(56) References Cited

U.S. PATENT DOCUMENTS

| | | | |
|---|---|---|---|
| 8,412,696 B2 | 4/2013 | Zhang et al. | |
| 8,589,375 B2 | 11/2013 | Zhang et al. | |
| 8,589,403 B2 | 11/2013 | Marquardt et al. | |
| 8,589,432 B2 | 11/2013 | Zhang et al. | |
| 8,682,925 B1 | 3/2014 | Marquardt et al. | |
| 8,738,587 B1 | 5/2014 | Bitincka et al. | |
| 8,738,629 B1 | 5/2014 | Bitincka et al. | |
| 8,788,525 B2 | 7/2014 | Neels et al. | |
| 8,788,526 B2 | 7/2014 | Neels et al. | |
| 8,826,434 B2 | 9/2014 | Merza | |
| 8,983,994 B2 | 3/2015 | Neels et al. | |

(Continued)

OTHER PUBLICATIONS

Metcalf, "Attackers Can Now Use Mimikatz to Implant Skeleton Key on Domain Controllers & BackDoor Your Active Directory Forest", https://adsecurity.org/?p=1275.

(Continued)

*Primary Examiner* — Eleni A Shiferam
*Assistant Examiner* — Bassam A Noaman
(74) *Attorney, Agent, or Firm* — Artegis Law Group, LLP

(57) ABSTRACT

Techniques for identifying attack behavior based on scripting language activity are disclosed. A security monitoring system generates a behavior profile for a first client device based on scripting language commands included in a first set of raw machine data received from the first client device, where the first client device is coupled to a network, and the first set of raw machine data is associated with network traffic received by or transmitted from the first client device. The security monitoring system analyzes a second set of raw machine data received from the first client device, where the second set of raw machine data is associated with subsequent network traffic received by or transmitted from the first client device. The security monitoring system detects an anomaly in the second set of raw machine data based on the behavior profile, and initiates a mitigation action in response to detecting the anomaly.

34 Claims, 15 Drawing Sheets

(56) References Cited

U.S. PATENT DOCUMENTS

| | | | |
|---|---|---|---|
| 9,124,612 B2 | 9/2015 | Vasan et al. | |
| 9,128,980 B2 | 9/2015 | Neels et al. | |
| 9,128,985 B2 | 9/2015 | Marquardt et al. | |
| 9,130,971 B2 | 9/2015 | Vasan et al. | |
| 9,173,801 B2 | 11/2015 | Merza | |
| 9,215,240 B2 | 12/2015 | Merza et al. | |
| 9,248,068 B2 | 2/2016 | Merza | |
| 9,401,925 B1* | 7/2016 | Guo | H04L 63/1416 |
| 9,426,172 B2 | 8/2016 | Merza | |
| 9,432,396 B2 | 8/2016 | Merza | |
| 9,514,189 B2 | 12/2016 | Bitincka et al. | |
| 9,589,012 B2 | 3/2017 | Neels et al. | |
| 10,581,879 B1* | 3/2020 | Paithane | G06F 21/566 |
| 2004/0260754 A1* | 12/2004 | Olson | H04L 29/06 709/200 |
| 2010/0024033 A1* | 1/2010 | Kang | G06F 21/53 726/23 |
| 2011/0307951 A1* | 12/2011 | Yermakov | H04L 63/0227 726/12 |
| 2013/0318236 A1 | 11/2013 | Coates et al. | |
| 2014/0330815 A1 | 11/2014 | Bitincka et al. | |
| 2015/0019537 A1 | 1/2015 | Neels et al. | |
| 2015/0180891 A1* | 6/2015 | Seward | H04L 63/1425 726/22 |
| 2015/0363598 A1* | 12/2015 | Xu | G06F 21/566 726/23 |
| 2016/0004750 A1 | 1/2016 | Marquardt et al. | |
| 2016/0028746 A1* | 1/2016 | Tonn | H04L 63/145 726/24 |
| 2016/0088125 A1 | 3/2016 | Polychronis | |
| 2016/0173507 A1* | 6/2016 | Avrahami | G06F 21/563 726/23 |
| 2016/0239596 A1* | 8/2016 | Pieczul | G06Q 30/02 |
| 2017/0126712 A1* | 5/2017 | Crabtree | H04L 63/1425 |
| 2018/0152471 A1* | 5/2018 | Jakobsson | G06Q 50/01 |
| 2018/0196942 A1* | 7/2018 | Kashyap | G06F 21/56 |

OTHER PUBLICATIONS

Metcalf, "Detecting Offensive PowerShell Attack Tools," ActiveDirectorySecurity, Malware, Microsoft Security, PowerShell, Technical Reference, https://adsecurity.org/?p=2604.

Dunwoody, "Greater Visibility Through PowerShell Logging," https://www.fireeye.com/blog/threat-research/2016/02/greater_visibilityt.html, Vulnerabilities, Threat Research, Feb. 11, 2016.

Foss, "PowerShell Command Line Logging," https://logrhythm.com/blog/powershell-command-line-logging/, Oct. 6, 2015.

Mandiant, "Appendix C: PowerShell Transcription," https://www.fireeye.com/content/dam/fireeye-www/blog/pdfs/powershell-logging-appendix-c.pdf, 2015 Mandiant, a FireEye Company.

Kazanciyan et al., "Investigating PowerShell Attacks," https://www.blackhat.com/docs/us-14/materials/us-14-Kazanciyan-Investigating-Powershell-Attacks.pdf. Black Hat USA 2014, Aug. 7, 2014.

"More Detecting Obfuscated PowerShell," http://www.leeholmes.com/blog/2016/10/22/more-detecting-obfuscated-powershell/, Oct. 22, 2016.

Turner et al."Command line process auditing,"https://technet.microsoft.com/windows-server-docs/identity/ad-ds/manage/component-updates/command-line-process-auditing, Mar. 7, 2017.

"Tweetalytics of DBIR-2015," https://securityblog.verizonenterprise.com/?p=7031, Verizon Enterprise.

* cited by examiner

FIG. 6A

| Data Summary | | | |
|---|---|---|---|
| Hosts (5) | Sources (8) | Sourcetypes (3) | ✕ | filter

| Host ◇ | | Count ◇ | Last Update ◇ |
|---|---|---|---|
| mailsv | ⌄ | 9,829 | 4/29/14 1:32:47.000 PM |
| vendor_sales | ⌄ | 30,244 | 4/29/14 1:32:46.000 PM |
| www1 | ⌄ | 24,221 | 4/29/14 1:32:44.000 PM |
| www2 | ⌄ | 22,595 | 4/29/14 1:32:47.000 PM |
| www3 | ⌄ | 22,975 | 4/29/14 1:32:45.000 PM |

IDENTIFYING ATTACK BEHAVIOR BASED ON SCRIPTING LANGUAGE ACTIVITY

BACKGROUND OF THE INVENTION

Field of the Invention

The present invention relates generally to computer network security and, more specifically, to identifying attack behavior based on scripting language activity.

Description of the Related Art

In the domain of computer network security, network-connected computing devices are vulnerable to various kinds of attacks, including attacks intended to affect the operation of the computing devices as well as attacks intended to access or steal sensitive or valuable data stored on the computing devices. In such attacks, attempts may be made to access the computing devices remotely. In addition, attempts may be made to implement malicious computer code or malware that can attack a computing device from within the computing device itself or from within a local network associated with the computing device.

In one common attack scenario, a user can inadvertently execute malicious software on a client device by opening an email attachment or installing a universal serial bus (USB) memory device that includes the malicious software. The malicious software may attempt to exercise local control of the client device by changing the execution policy of the client device to allow remote execution and/or execution at a higher privilege level than normally associated with the particular client device. For example, the malicious software could change the execution policy of the client device in order to acquire system administrator or super user privileges over the client device. The malicious software may then download and execute a special script written in a scripting language that is configured to access confidential private data and transmit that data to a remote computer associated with the malicious software. The script also may scan the network in search of additional client devices to infect and install instances of itself on those additional client devices. The script then is able to repeat the above process on the additional client devices, resulting in further spread of the script and further compromising of confidential private data.

One potential solution to addressing securing threats posed by malicious software is to scan client device files, such as email attachments and files on an installed USB memory device prior to opening or executing those files. In so doing, the files can be compared against a database of search substrings that are known to be associated with malicious software. If a file contains one or more of the search substrings included in the database, then the file can be marked as potentially malicious and quarantined to prevent execution.

One drawback to this approach, however, is that creators and distributors of malicious software often use obfuscation techniques, such as encoding the malicious software, to avoid detection. Further, those obfuscation techniques can change frequently over time. If a file containing malicious software is obfuscated, especially if the obfuscation technique is new, then comparing that file against a database of known search substrings may very well fail to detect the fact that the file is malicious. Another drawback to the above approach is that script commands included in malicious software may be similar to commands used by legitimate users, such as system administrators and super users. If a search substring included in a search substring database is associated with a command that may be legitimately employed by a system administrator or a super user, then a file that includes a legitimate script could be incorrectly identified as malicious, leading to false positives.

As the foregoing illustrates, what is needed in the art are more effective ways to detect and mitigate malicious software in computer network environments.

SUMMARY OF THE INVENTION

Various embodiments of the present application set forth a method for identifying attack behavior based on scripting language activity. The method includes generating a first behavior profile for a first client device based on scripting language commands included in a first set of raw machine data received from the first client device, where the first client device is coupled to a network, and the first set of raw machine data is associated with network traffic received by or transmitted from the first client device. The first set of raw machine data is analyzed and used to train a hybrid machine learning based system that learns an internal "language model" of the data, as well as builds dynamic relationship graphs in order to establish a multi-evidence collection paradigm. The method further includes analyzing a second set of raw machine data received from the first client device, where the second set of raw machine data is associated with subsequent network traffic received by or transmitted from the first client device. This second set of raw machine data is further combined in the scoring phase of the machine learning workflow to compare against the learned representation of evidence and normal device behavior. The method further includes detecting an anomaly in the second set of raw machine data based on the first behavior profile. The method further includes initiating a mitigation action with respect to the first client device in response to detecting the anomaly.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that malicious software is detected with greater accuracy relative to prior security methods that are rely heavily on static signature based detections such as substring searches and pattern matching. Behavior anomalies are detected at the granularity of the individual client device alongside an overlay of multi-contextual evidence based on the profile of the operator using the device, leading to faster and earlier detection of behavior anomalies that indicated potentially malicious activity. Further, the potential for falsely identifying legitimate system administrator and super user activity as malicious behavior may be reduced relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A illustrates a search screen in accordance with the disclosed embodiments;

FIG. 6B illustrates a data summary dialog that enables a user to select various data sources in accordance with the disclosed embodiments;

FIG. 8B illustrates an incident review dashboard in accordance with the disclosed embodiments;

DETAILED DESCRIPTION

Figure 1:
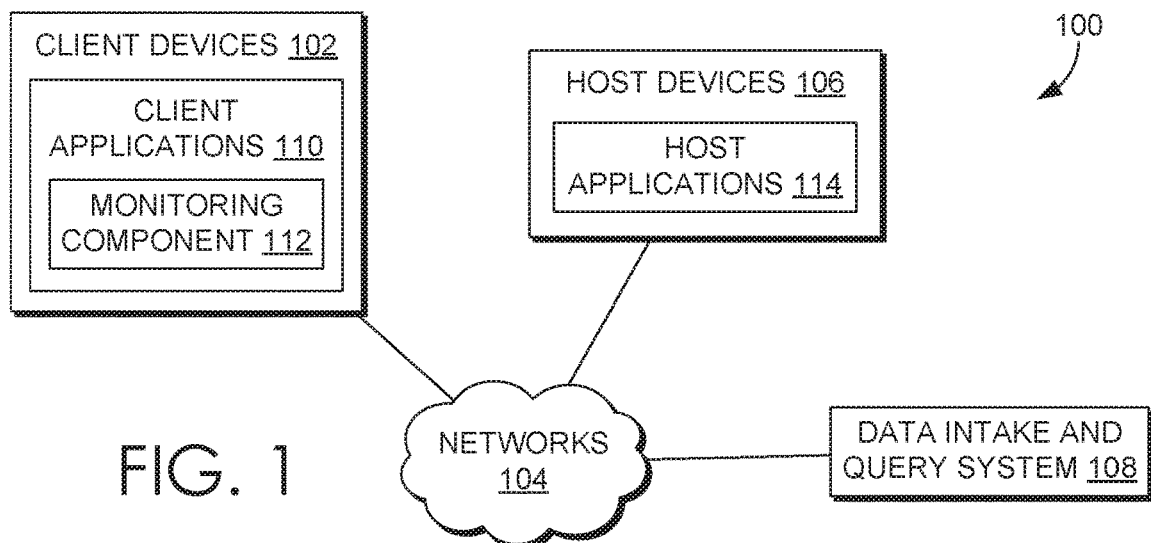
FIG. 1 illustrates a networked computer environment in which an embodiment may be implemented.

In the following description, numerous specific details are set forth to provide a more thorough understanding of the present invention. However, it will be apparent to one of skill in the art that embodiments of the present invention may be practiced without one or more of these specific details.

System Overview

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Cloud-Based System Overview
   2.13. Searching Externally Archived Data
      2.13.1. ERP Process Features 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
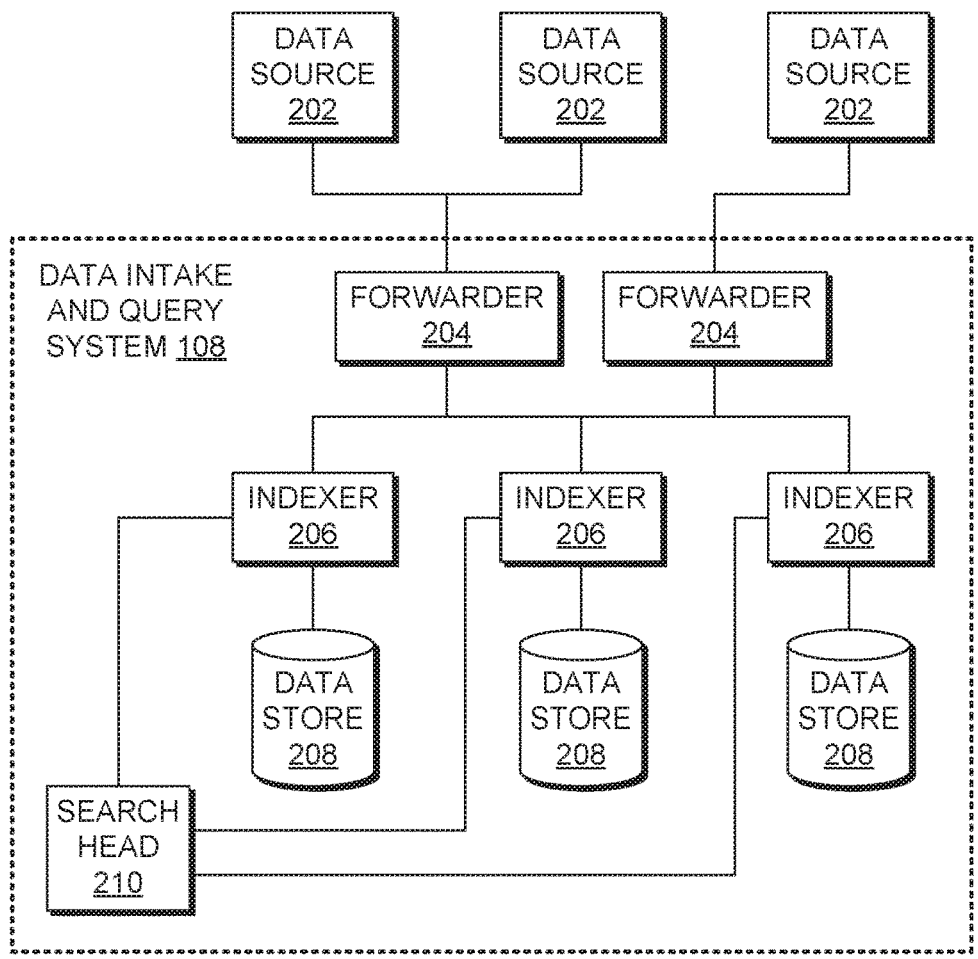
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
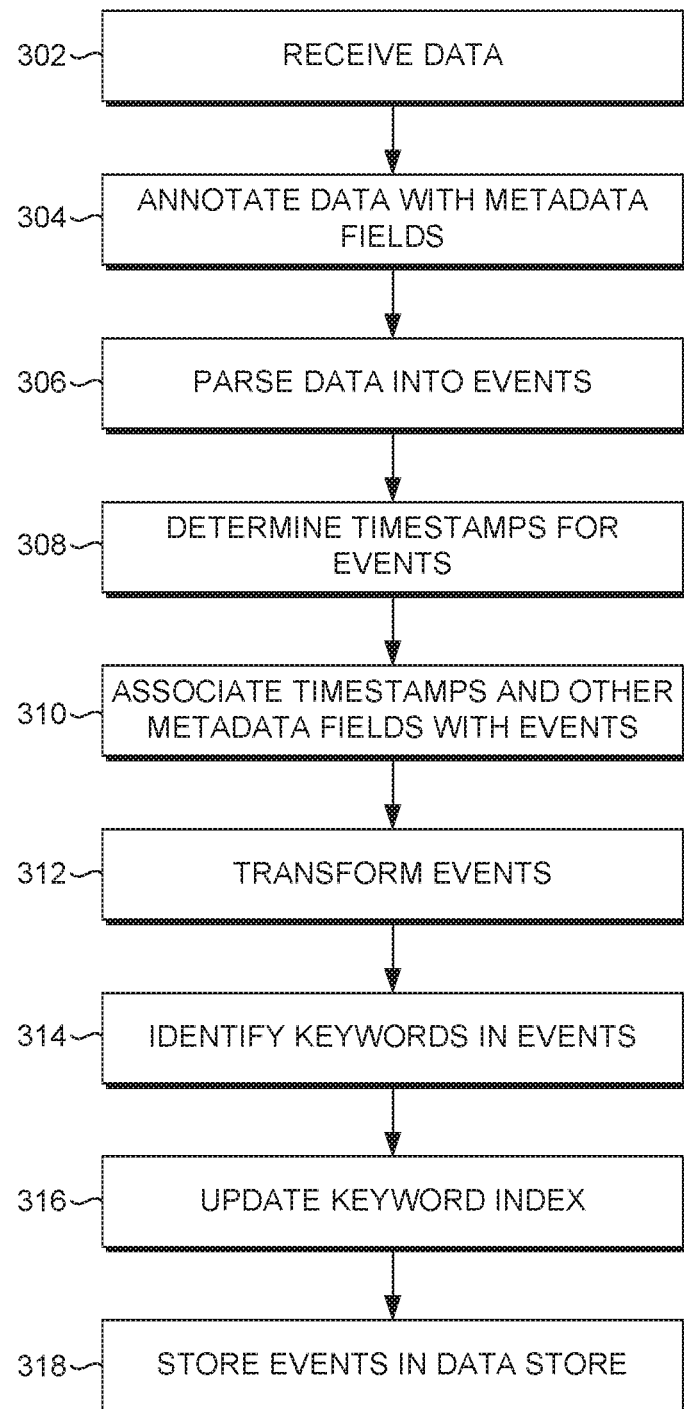
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks" or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
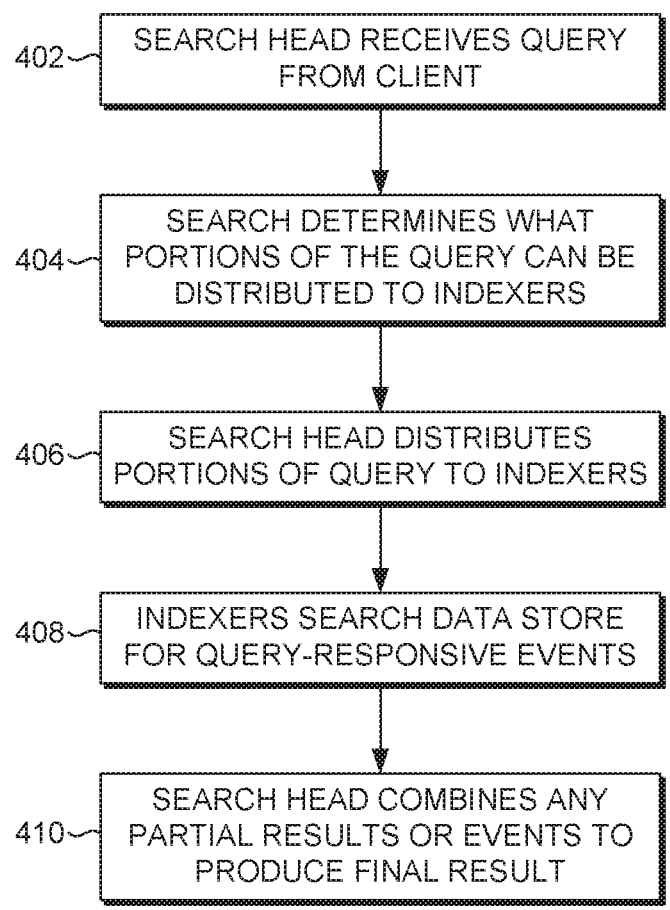
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
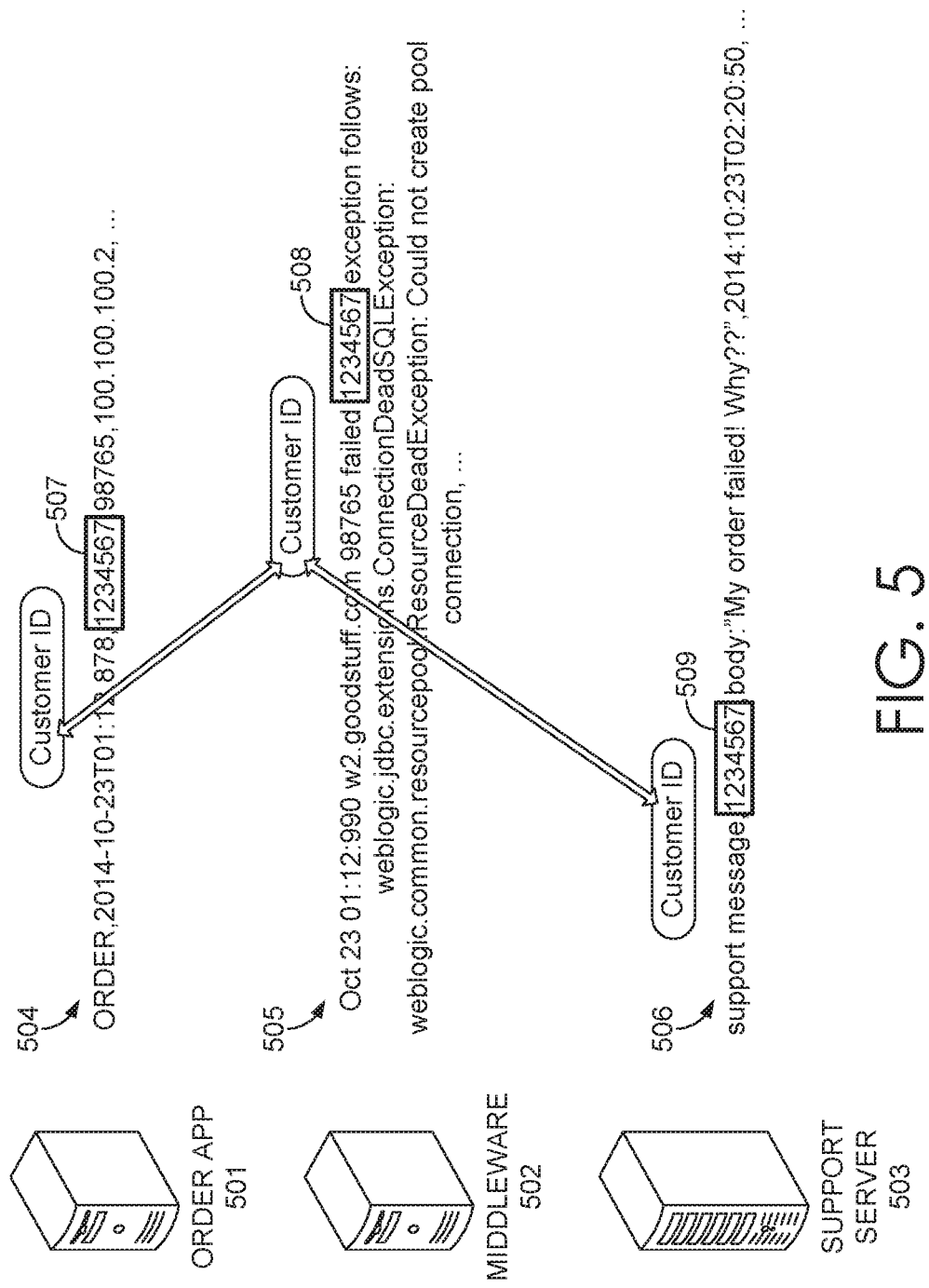
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
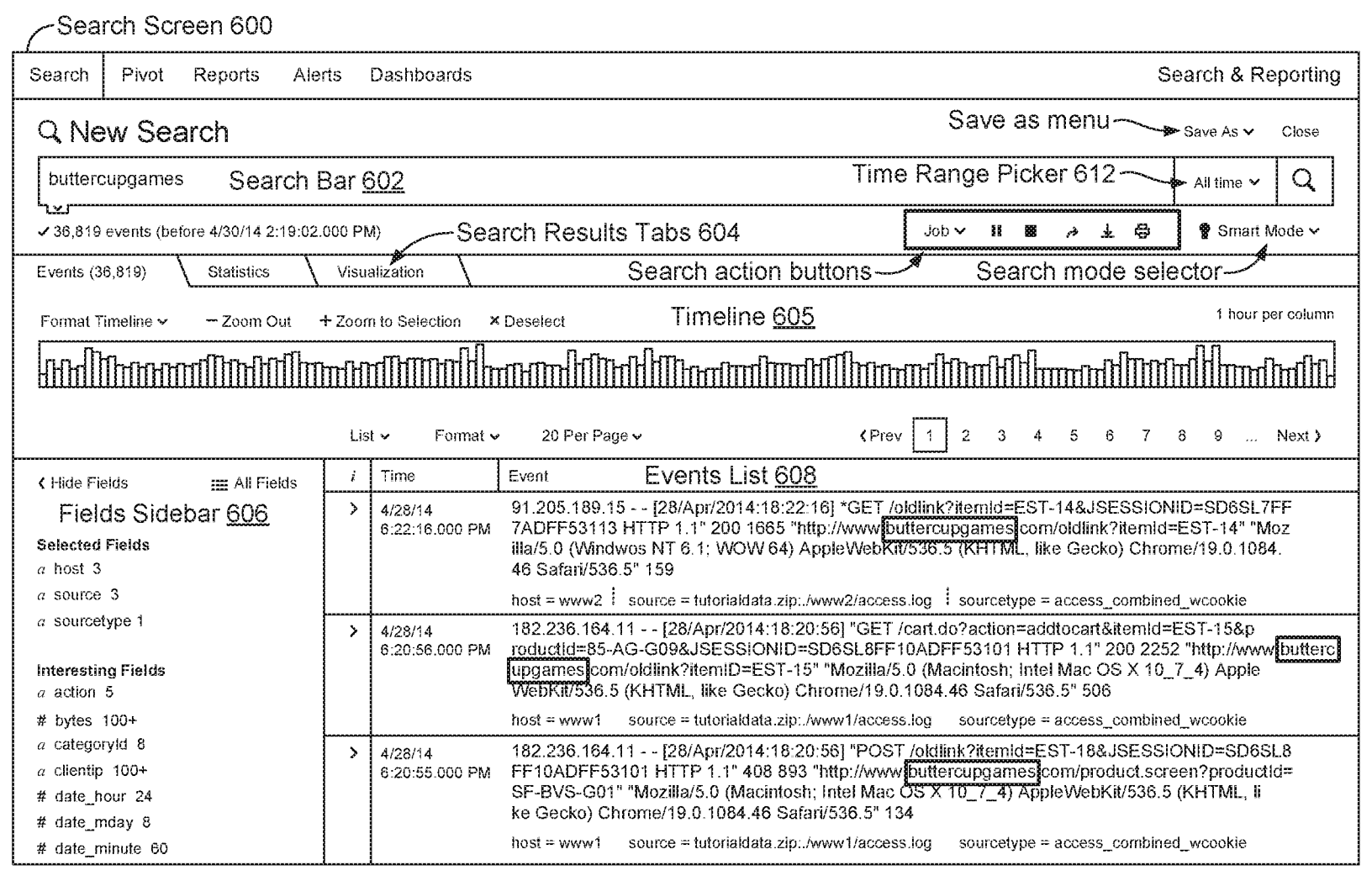

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 7:
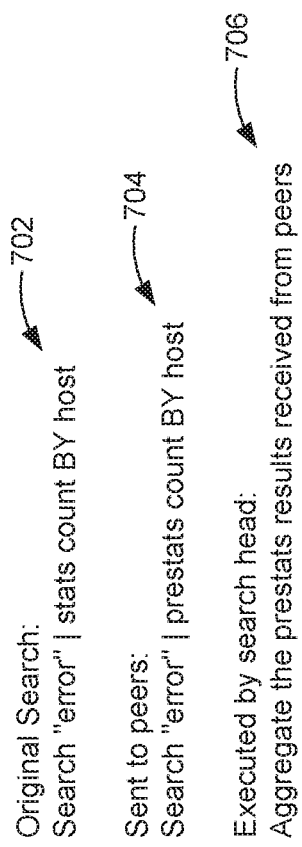
FIG. 7 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 7 illustrates how a search query 702 received from a client at a search head 210 can split into two phases, including: (1) subtasks 704 (e.g., data retrieval or simple filtering) that may be performed in parallel by indexers 206 for execution, and (2) a search results aggregation operation 706 to be executed by the search head when the results are ultimately collected from the indexers.

During operation, upon receiving search query 702, a search head 210 determines that a portion of the operations involved with the search query may be performed locally by the search head. The search head modifies search query 702 by substituting "stats" (create aggregate statistics over results sets received from the indexers at the search head) with "prestats" (create statistics by the indexer from local results set) to produce search query 704, and then distributes search query 704 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 706 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at dataingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
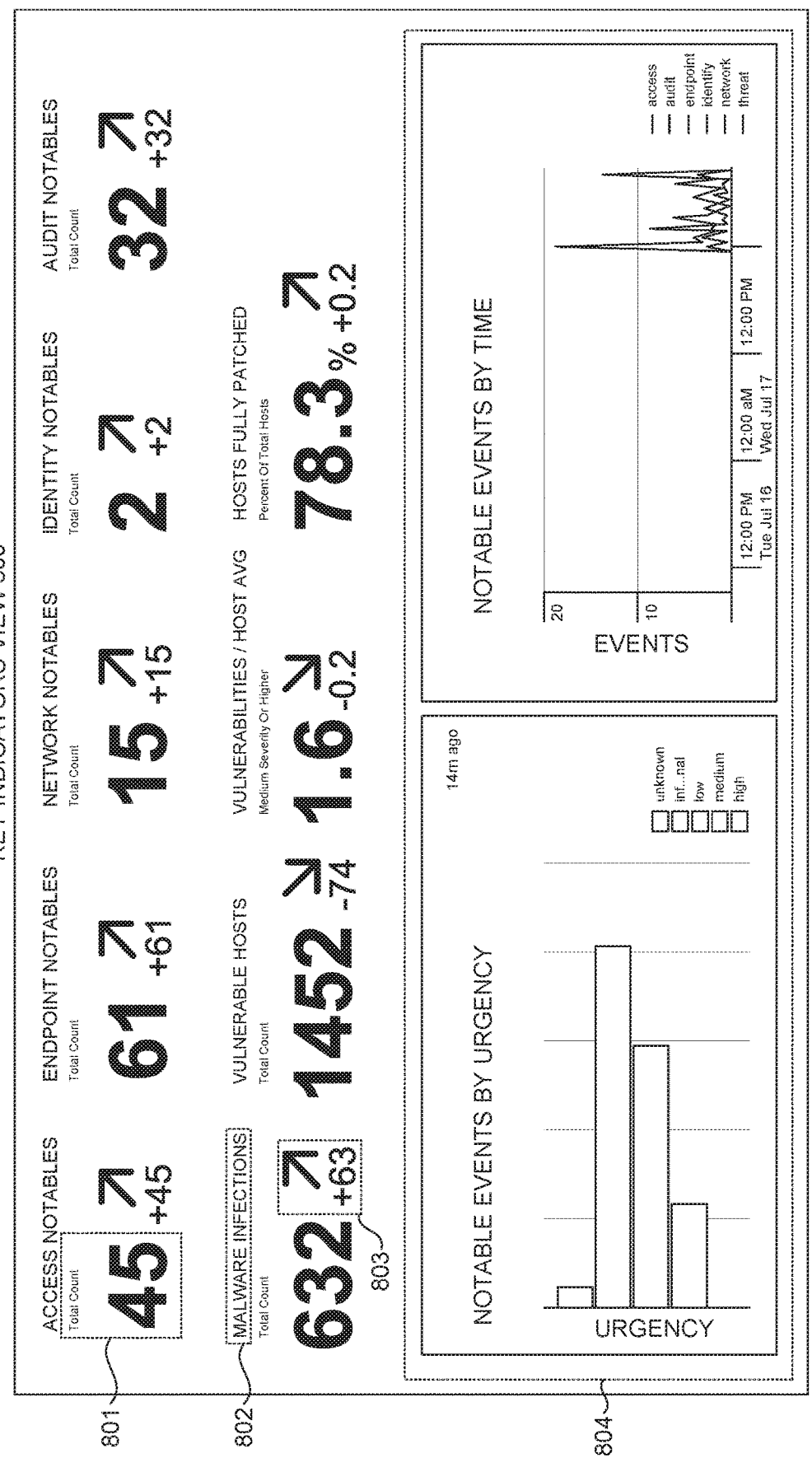
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 8B:
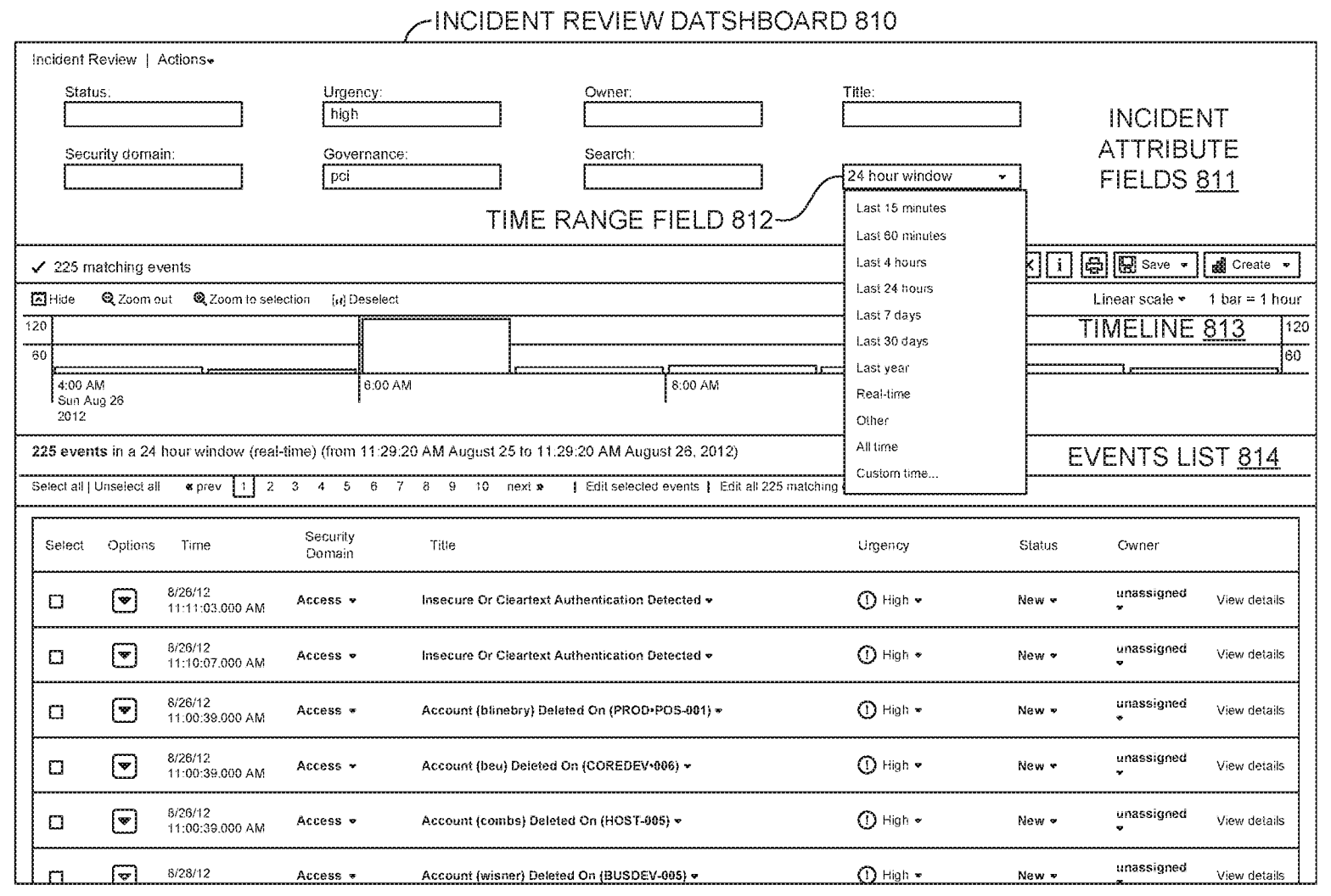

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 9:
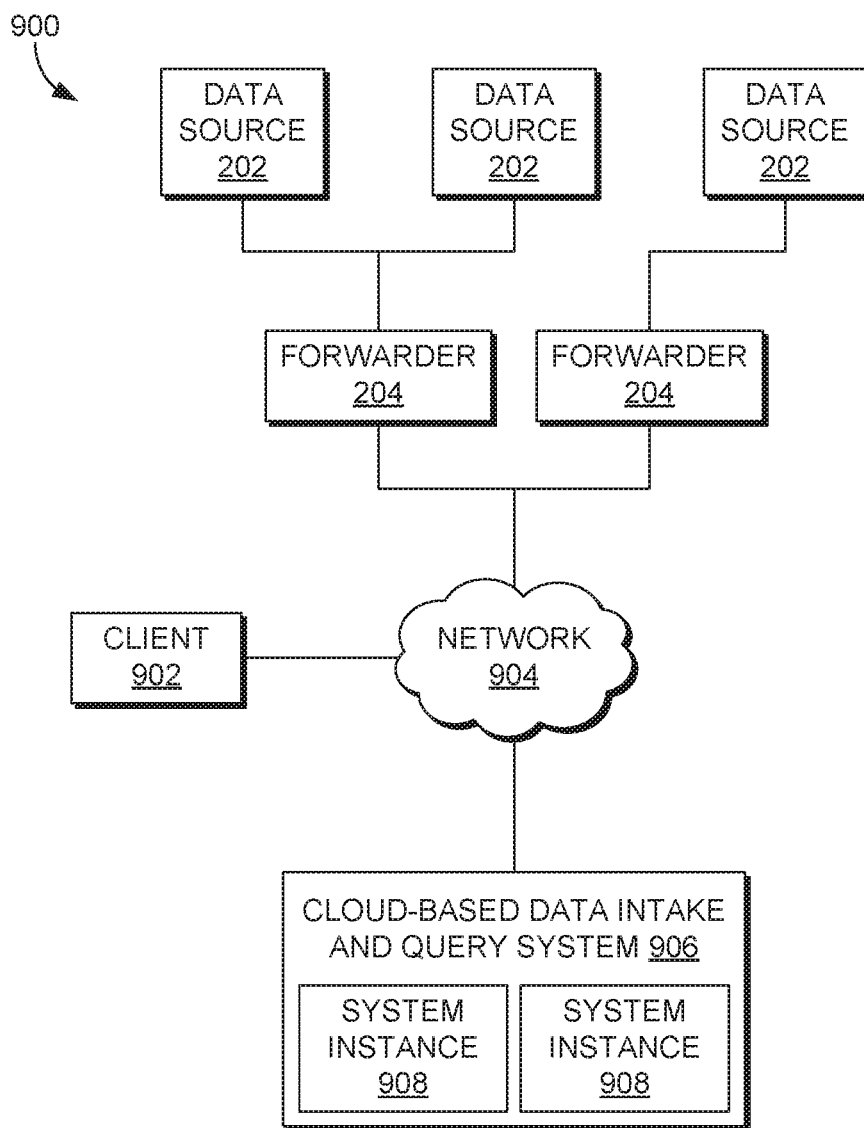
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. These input data sources and forwarders may be in a subscriber's private computing environment. Alternatively, they might be directly managed by the service provider as part of the cloud service. In the example system 900, one or more forwarders 204 and client devices 902 are coupled to a cloud-based data intake and query system 906 via one or more networks 904. Network 904 broadly represents one or more LANs, WANs, cellular networks, intranetworks, internetworks, etc., using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.13. Searching Externally Archived Data

Figure 10:
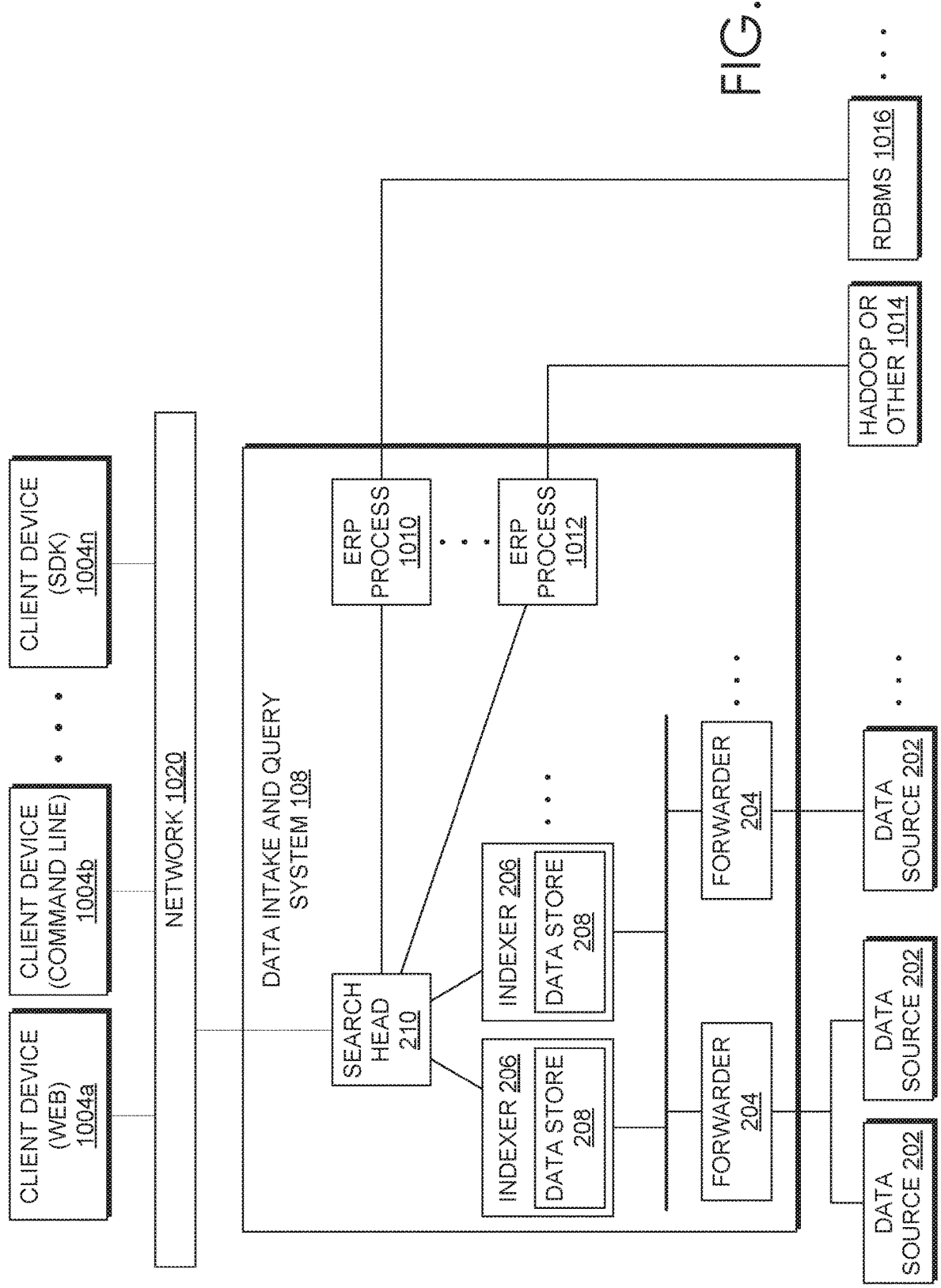
FIG. 10 illustrates a block diagram of an example data intake and query system that performs searches across external data systems in accordance with the disclosed embodiments.

FIG. 10 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1004 over network connections 1020. As discussed above, the data intake and query system 108 may reside in an enterprise location, in the cloud, etc. FIG. 10 illustrates that multiple client devices 1004a, 1004b, . . . , 1004n may communicate with the data intake and query system 108. The client devices 1004 may communicate with the data intake and query system using a variety of connections. For example, one client device in FIG. 10 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1004 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1010. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1010, 1012. FIG. 10 shows two ERP processes 1010, 1012 that connect to respective remote (external) virtual indices, which are indicated as a Hadoop or another system 1014 (e.g., Amazon S3, Amazon EMR, other Hadoop Compatible File Systems (HCFS), etc.) and a relational database management system (RDBMS) 1016. Other virtual indices may include other file organizations and protocols, such as Structured Query Language (SQL) and the like. The ellipses between the ERP processes 1010, 1012 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1010, 1012 receive a search request from the search head 210. The search head may optimize the received search request for execution at the respective external virtual index. Alternatively, the ERP process may receive a search request as a result of analysis performed by the search head or by a different system process. The ERP processes 1010, 1012 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1010, 1012 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1010, 1012 generate appropriate search requests in the protocol and syntax of the respective virtual indices 1014, 1016, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1004 may communicate with the data intake and query system 108 through a network interface 1020, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.13.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational.' Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

Attack Behavior Identification

As further described herein, the data intake and query system 108 described in conjunction with FIGS. 1-10 can be used in conjunction with a security monitoring system described in conjunction with FIGS. 11-14 in order to detect and mitigate attack behavior. In various embodiments, such attack behavior may be directed to client devices 102, host devices 104, and any other devices and systems communicating over one or more networks 104. The security monitoring system is capable to receive and analyze data that is part of an event is referred to herein as "event data" and stored within the data intake and query system 108. In addition, the security monitoring system is capable to receive and analyze raw machine data, such as data received or retrieved from one or more system log files, streams of network packet data, sensor data, application program data, error logs, stack traces, system performance data, and so on. The data intake and query system 108 and/or the security monitoring system divides this raw data into blocks (e.g., buckets of data, each associated with a specific time frame, etc.), and parses the raw data to produce timestamped events. The data intake and query system 108 and/or the security monitoring system stores the timestamped events in a data store. In various embodiments, such a data store may be located in either or both of the data intake and query system 108 and/or the security monitoring system. Although many of the techniques described herein are explained with reference to a data intake and query system 108, these techniques are also applicable to all other technically feasible types of data systems.

Figure 11:
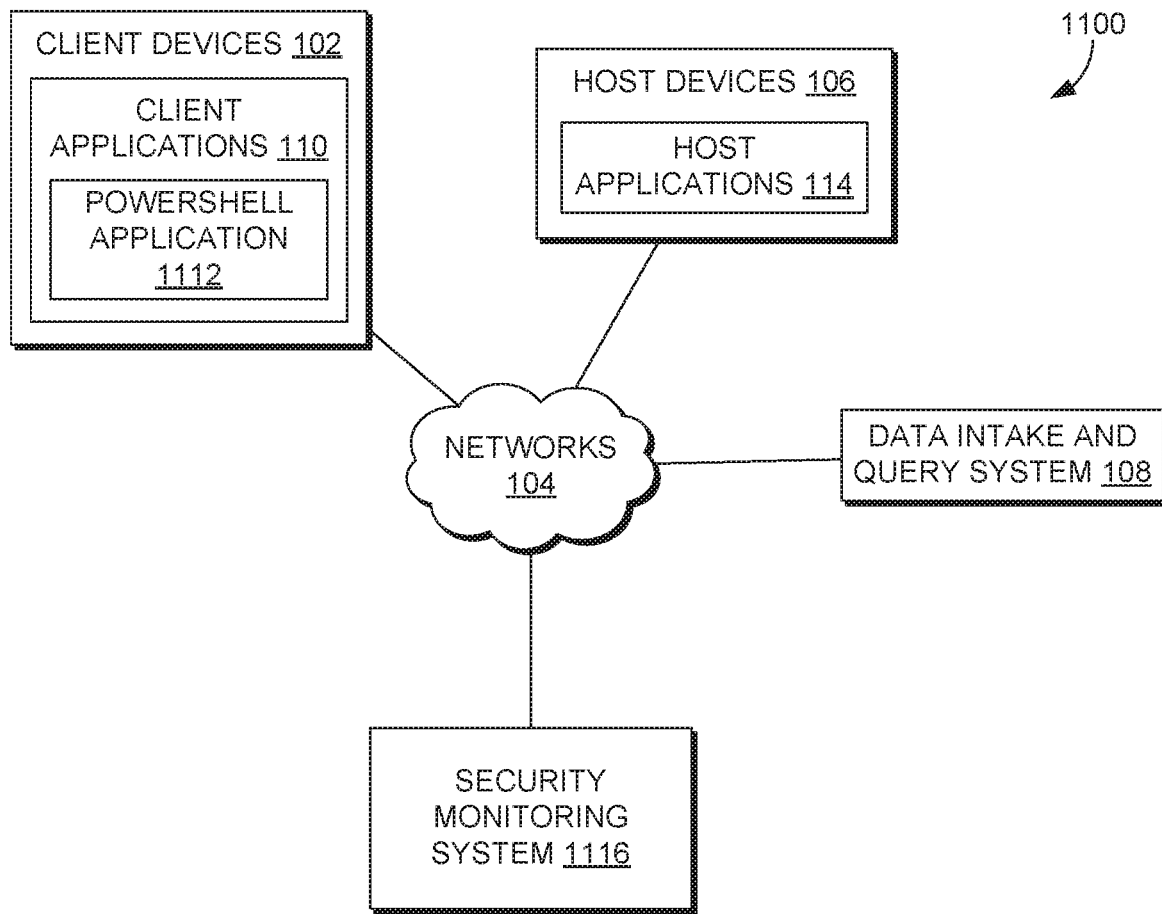
FIG. 11 illustrates another networked computer environment in which an embodiment may be implemented.

FIG. 11 illustrates another networked computer environment 1100 in which an embodiment may be implemented. As shown, the networked computer environment 1100 includes, without limitation, client devices 102, host devices 106, a data intake and query system 108, and a security monitoring system 1116 that communicate with each other over one or more networks 104. The client devices 102, host devices 106, data intake and query system 108, and networks 104 function substantially the same as corresponding elements of the networked computer environment 100 of FIG. 1 except as further described below.

The security monitoring system 1116 is associated with one or more computer networks 104. The security monitoring system 1116 identifies attack behavior of a malicious client device based on scripting language activity, such as actions associated with the PowerShell scripting language. The security monitoring system 1116 receives streaming data from one or more client devices 102 and/or one or more host devices 106, where the streaming data includes information regarding scripting language commands executed by each of the client devices 102. In some embodiments, the security monitoring system 1116 may access one or more log files generated by PowerShell application 1112 executing on one or more client devices 102, where PowerShell is a task automation and configuration management framework from MICROSOFT, consisting of a command-line shell and associated scripting language built on the .NET Framework. In alternative embodiments, the security monitoring system 1116 may access one or more log files generated by any alternative scripting language that enables a user to perform various administrative functions for one or more client devices 102 and associated with functions performed by a system administrator and/or super user.

The streaming data can be accessed from log files associated with client devices 102, packet capture data derived from message traffic over networks 104, or any other technical feasible data source. The security monitoring system 1116 builds profiles of scripting language behaviors for each individual client device included in the client devices 102.

For each client device included in the client devices 102, the security monitoring system 1116 enters a machine learning training phase to characterize a sufficient amount of historical behavior of the client devices 102 to establish a baseline behavior for the client devices 102. When a sufficient amount of historical behavior is characterized for a particular client device included in the client devices 102, the security monitoring system 1116 enters a scoring phase for that client device. In the scoring phase, the security monitoring system 1116 computes a risk value for the current behavior of the client devices 102 compared to the baseline behavior for the corresponding client device. If the current behavior of a client device varies sufficiently from the baseline behavior, then the security monitoring system identifies that the client device is engaged an anomalous behavior. Further, the security monitoring system 1116 clusters the client devices into one or more clusters of client devices 102, where the client devices 102 within a particular cluster have similar baseline behaviors. If the current behavior of a client device varies sufficiently from the baseline behavior associated with the corresponding cluster, then the security monitoring system 1116 identifies that the client device is engaged an anomalous behavior. Upon detecting anomalous behavior, the security monitoring system 1116 initiates a mitigation action with respect to the first client device.

Figure 12:
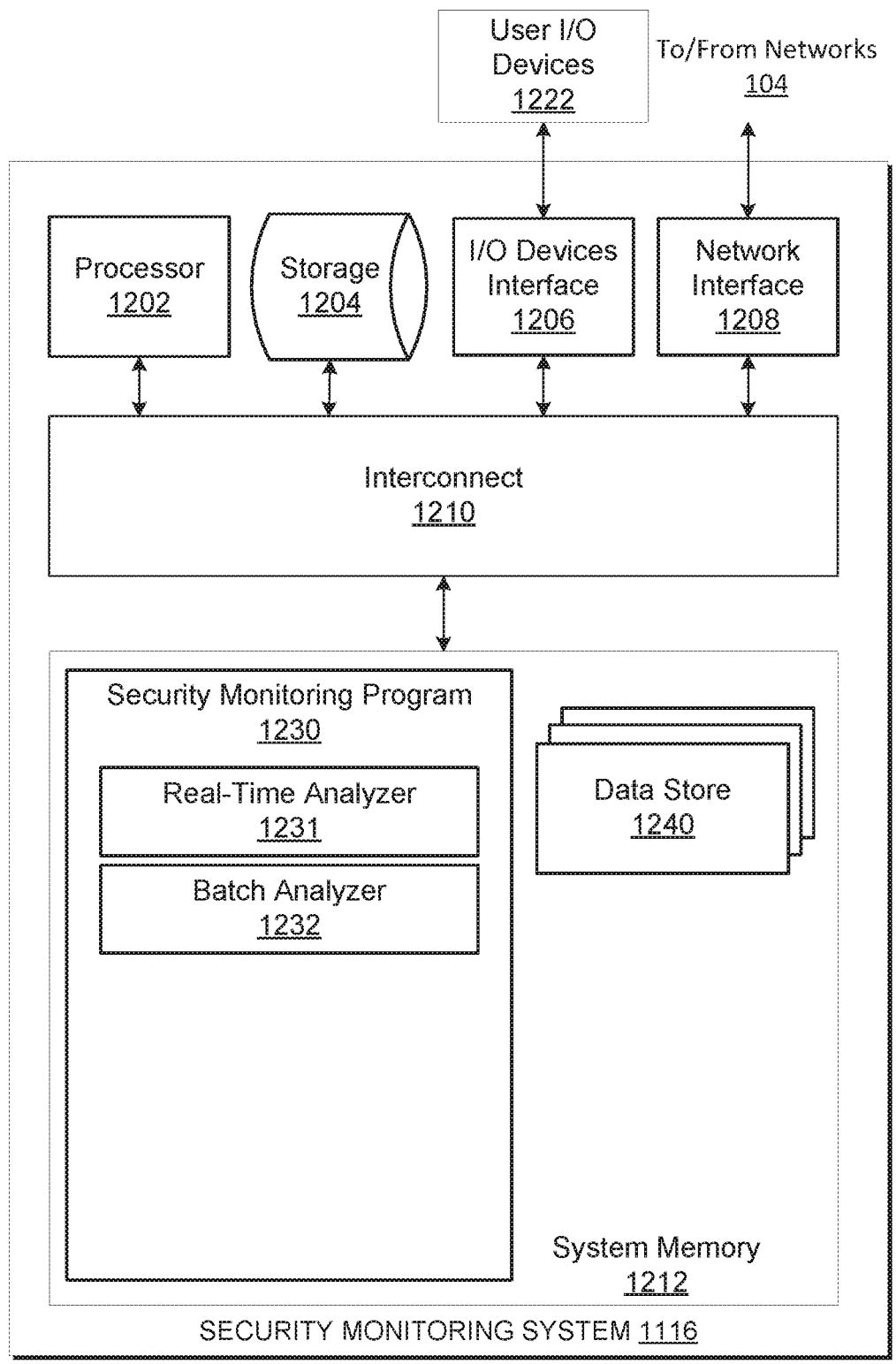
FIG. 12 is a more detailed illustration of the security monitoring system of FIG. 11 in accordance with the disclosed embodiments.

FIG. 12 is a more detailed illustration of the security monitoring system 1116 of FIG. 11 in accordance with the disclosed embodiments. As shown, the security monitoring system 1116 includes, without limitation, a processor 1202, storage 1204, an input/output (I/O) device interface 1206, a network interface 1208, an interconnect 1210, and a system memory 1212. The computer system 100 of FIG. 1 can be configured to implement the security monitoring system 1116. The processor 1202, storage 1204, I/O device interface 1206, network interface 1208, interconnect 1210, and system memory 1212 function substantially the same as described in conjunction with FIG. 1 except as further described below.

In general, processor 1202 retrieves and executes programming instructions stored in the system memory 1212. Processor 1202 may be any technically feasible form of processing device configured to process data and execute program code. Processor 1202 could be, for example, a central processing unit (CPU), a graphics processing unit (GPU), an application-specific integrated circuit (ASIC), a field-programmable gate array (FPGA), and so forth. Processor 1202 stores and retrieves application data residing in the system memory 1212. Processor 1202 is included to be representative of a single CPU, multiple CPUs, a single CPU having multiple processing cores, and the like. In operation, processor 1202 is the master processor of security monitoring system 1116, controlling and coordinating operations of other system components. System memory 1212 stores software applications and data for use by processor 1202. Processor 1202 executes software applications stored within system memory 1212 and optionally an operating system. In particular, processor 1202 executes software and then performs one or more of the functions and operations set forth in the present application The storage 1204 may be a disk drive storage device. Although shown as a single unit, the storage 1204 may be a combination of fixed and/or removable storage devices, such as fixed disc drives, floppy disc drives, tape drives, removable memory cards, or optical storage, network attached storage (NAS), or a storage area-network (SAN). Processor 1202 communicates to other computing devices and systems via network interface 1208, where network interface 1208 is configured to transmit and receive data via a communications network.

The interconnect 1210 facilitates transmission, such as of programming instructions and application data, between the processor 1202, input/output (I/O) devices interface 1206, storage 1204, network interface 1208, and system memory 1212. The I/O devices interface 1206 is configured to receive input data from user I/O devices 1222. Examples of user I/O devices 1222 may include one of more buttons, a keyboard, and a mouse or other pointing device. The I/O devices interface 1206 may also include an audio output unit configured to generate an electrical audio output signal, and user I/O devices 1222 may further include a speaker configured to generate an acoustic output in response to the electrical audio output signal. Another example of a user I/O device 1222 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 1212 includes, without limitation, a security monitoring program 1230, and a data store 1240. The security monitoring program 1230, in turn, includes, without limitation, a real-time analyzer 1231 and a batch analyzer 1232.

The real-time analyzer 1231 accesses streaming data from the interconnect 1210 of the security monitoring system 1116. The real-time analyzer 1231 receives streaming data from one or more client devices 102 via one or more networks 104, where the streaming data includes information regarding scripting language commands executed by each of the client devices 102. The streaming data can be accessed from log files associated with client devices 102, packet capture data derived from message traffic over networks 104, or any other technical feasible data source. The real-time analyzer 1231 analyzes streaming data in real-time as the streaming data received by the security monitoring system 1116 in order to detect anomalies, threat indicators and threats.

In addition, the real-time analyzer 1231 formats the streaming data and provides the formatted data to the batch analyzer 1232 for further detecting anomalies, threat indicators and threats. While the event data is provided to the real-time analyzer 1231 in a streaming, record-by-record manner, the event is provided to the batch analyzer in the form of batches of data, where each batch of event data contains a collection of events that arrived over the batch period. In addition to the receiving data from the real-time analyzer 1231 receives, the batch analyzer 1232 can receive additional historical event data from the security monitoring system 1116, prior analysis results, the model states, and other supporting data from the real-time analyzer 1231.

In some embodiments, the real-time analyzer 1231 and the batch analyzer 1232 may employ machine learning models to evaluate and analyze data. In some embodiments, the real-time analyzer 1231 and the batch analyzer 1232 may also employ other suitable forms of analysis, including, without limitation, rule-based analysis, algorithm-based analysis, and statistical analysis. The real-time analyzer 1231 and the batch analyzer 1232 each produce one or more risk scores based on heuristics that assess the likelihood that one or more client devices 102 have been adversely affected by malicious software. In some embodiments, the real-time analyzer 1231 and the batch analyzer 1232 may be included in a data analysis and processing architecture that is optimized to process large amounts of data in both a streaming and batch processing in parallel. Such a streaming and batch processing architecture is referred to herein as a lambda architecture. The real-time analyzer 1231 and the batch analyzer 1232 are now described in further detail.

Figure 13:
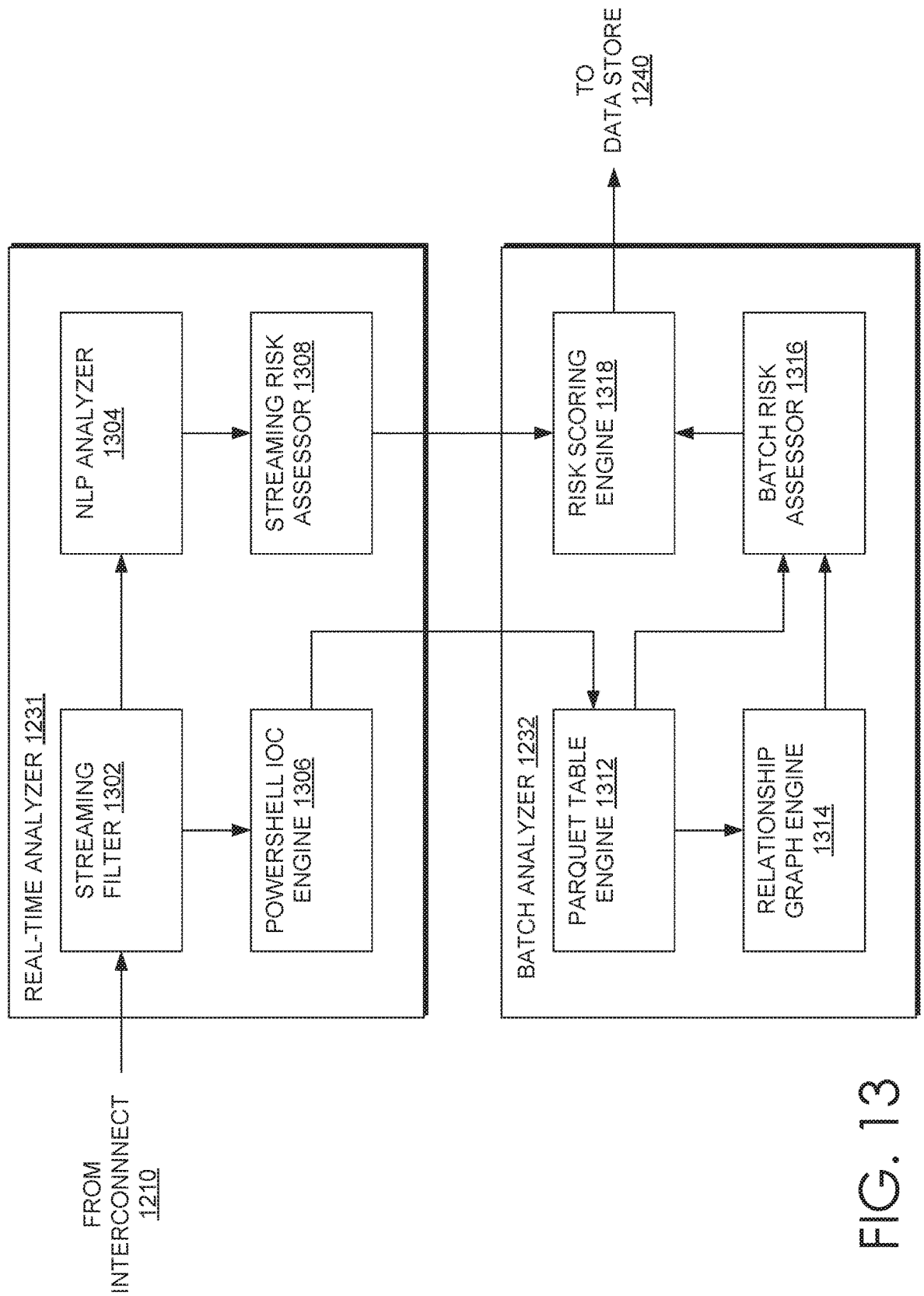
FIG. 13 is a more detailed illustration of the real-time analyzer and the batch analyzer of FIG. 12 in accordance with the disclosed embodiments.

FIG. 13 is a more detailed illustration of the real-time analyzer 1231 and the batch analyzer 1232 of FIG. 12 in accordance with the disclosed embodiments. As shown the real-time analyzer 1231 includes, without limitation, a streaming filter 1302, a natural language processing (NLP) analyzer 1304, a PowerShell indicators of compromise (IOC) engine 1306, and a streaming risk assessor 1308. The batch analyzer 1232 includes, without limitation, includes a parquet table engine 1312, a relationship graph engine 1314, a batch risk assessor 1316, and a risk scoring engine 1318.

The streaming filter 1302 receives streaming data, also referred to herein as recorded information, from one or more client devices 102 and host devices 106. The streaming filter 1302 accesses the streaming data from log files associated with client devices, packet capture data derived from message traffic over a computer network, or any other technical feasible data source. The streaming data is associated with the execution of commands in a scripting language. In some embodiments, the streaming data may represent commands and actions associated with PowerShell scripts executing on the client devices 102 and/or host devices 106. The streaming filter 1302 is capable to receive and analyze data that is part of an event is referred to herein as "event data" and stored within the data intake and query system 108. In addition, the streaming filter 1302 is capable to receive and analyze raw machine data, such as data received or retrieved from one or more system log files, streams of network packet data, sensor data, application program data, error logs, stack traces, system performance data, and so on. The streaming data may be in any technically feasible format, including, without limitation, raw machine data or Splunk events. In some embodiments, the streaming filter 1302 may perform an extract, transform, and load (ETL) process on the incoming streaming data to generate data in a format that is amenable to further analysis by the real-time analyzer 1231 and the batch analyzer 1232. In so doing, the streaming filter 1302 may remove or otherwise filter streaming data that is not relevant to security threat detection while retaining relevant streaming data. The streaming filter 1302 builds individual profiles of behaviors for each account associated with a client device, referred to herein as behavior profiles, by sorting the streaming data into a separate time series for each account. The behavior profiles are based on scripting language commands included in the streaming data. Each time series includes scripting language actions associated with the device and the time associated with each scripting language action. In some embodiments, each time series may have the form (account id, (time 1, action 1), (time 2, action 2), . . . ), where "account id" is an identifier of an account associated with the client device, "time 'n'" is the time when a given action has occurred, and "action 'n'" is the action corresponding to time 'n.' The streaming filter 1302 transmits the formatted and filtered streaming data to the NLP analyzer 1304 and the IOC engine 1306.

The NLP analyzer 1304 receives formatted and filtered streaming data from the streaming filter 1302. The NLP analyzer 1304 performs various natural language processing techniques on the formatted and filtered streaming data, including building an internal language model individualized to each user in the environment. In one example, and without limitation, the NLP analyzer 1304 could detect streaming data that has been obfuscated according to various types of encoding schema, such as base 64 encoding, and could decode the obfuscated streaming data. In another example, and without limitation, the NLP analyzer 1304 could perform substring match detection against certain script commands that include particularly high risk commands. Such high risk commands could be an indicator of malicious behavior. In yet another example, and without limitation, the NLP analyzer 1304 could detect an account that is attempting to escalate a privilege level for the account. Privilege escalation could likewise be an indicator of malicious behavior. In yet another example, and without limitation, the NLP analyzer 1304 could perform lexical analysis on the formatted and filtered streaming data to determine an entropy value associated with the formatted and filtered streaming data. In some embodiments, such lexical analysis may include n-gram analysis, where an n-gram is a sequence of 'n' sequential characters in the formatted and filtered streaming data. In a particular example, and without limitation, the lexical analysis may include bigram analysis, where a bigram is a sequence of 2 sequential characters in the formatted and filtered streaming data. The NLP analyzer 1304 could keep count of all the different sequences of 'n' characters that occur in the formatted and filtered streaming data. A sudden change in the count and distribution of n-grams could cause the entry value to change suddenly and significantly. Such a sudden change could be indicative of malicious software behavior. The NLP analyzer 1304 transmits the results of the various NLP tests to the streaming risk assessor 1308.

The PowerShell IOC engine 1306 receives formatted and filtered streaming data from the streaming filter 1302. The PowerShell IOC engine 1306 builds individual profiles of scripting language behaviors for each individual client device by sorting the formatted and filtered streaming data into a separate time series for each client device. Each client device includes scripting language actions associated with the device and the time associated with each scripting language action. In some embodiments, each time series may have the form (account id, (time 1, action 1), (time 2, action 2), . . . ), where "account id" is an identifier of an account associated with the client device, "time 'n'" is the time when a given action has occurred, and "action 'n'" is the action corresponding to time 'n.' Periodically, the PowerShell IOC engine 1306 transmits the time series data to the parquet table engine 1312.

The streaming risk assessor 1308 receives NLP analysis results from the NLP analyzer 1304. Based on the received NLP analysis results, the streaming risk assessor 1308 computes a heuristic risk value that represents a risk assessment associated with the formatted and filtered streaming data alongside the fusion of multiple pieces of individual evidence, otherwise referred to herein as features. The streaming risk assessor 1308 transmits the heuristic risk value to the risk scoring engine 1318.

The parquet table engine 1312 receives time series data for each client device from the PowerShell IOC engine 1306. The parquet table engine 1312 organizes the time series data into a relational database. In some embodiments, the parquet table engine 1312 may organize the time series data into parquet tables compatible with Apache Hadoop. The parquet table engine 1312 performs certain analysis functions on the data stored within the parquet tables. The parquet table engine 1312 enters a machine learning training mode to establish a baseline behavior for each account associated with a client device. For a given account, the parquet table engine 1312 analyzes historical data represented by the time series stored in the parquet tables until enough data is analyzed to establish a reliable baseline behavior. When a reliable baseline behavior is established for a given account, the parquet table engine 1312 transitions to an anomaly detection phase for the given account. In the anomaly detection mode, the parquet table engine 1312 evaluates newly arriving time series data for an account relative to the baseline behavior for that account. Newly arriving time series data for an account that differs significantly from the baseline behavior for the account may indicate an anomaly associated with potentially malicious software.

In one example, and without limitation, the parquet table engine 1312 determines whether an account is a first time PowerShell user. In this example, a given account does not indicate any PowerShell commands in the baseline behavior, but the newly arriving time series data for the account indicates that the account has executed one or more PowerShell commands. In another example, and without limitation, the parquet table engine 1312 determines whether an account has employed a new PowerShell command. In this example, a given account is associated with a baseline behavior indicating that the account employs PowerShell commands. However, the newly arriving time series data for the account indicates that the account has executed one or more PowerShell commands that do not appear in the baseline behavior associated with the account. The parquet table engine 1312 transmits the results of the above analysis functions to the batch risk assessor 1316. Further, the parquet table engine 1312 transmits the time series data to the relationship graph engine 1314.

The relationship graph engine 1314 receives time series data from the parquet table engine 1312. The relationship graph engine 1314 organizes the time series data according to the relationships that the accounts have to each other. The relationship graph engine 1314 groups accounts associated with client devices into clusters, where the accounts within a particular cluster have similar baseline behaviors. In some embodiments, the accounts may be clustered by employing a latent Dirichlet allocation (LDA) approach. The relationship graph engine 1314 performs certain analysis functions on the data stored within the relationship graph. Current behavior of an account that varies sufficiently from the baseline behavior associated with the corresponding cluster indicates an anomaly associated with potentially malicious software. In one example, and without limitation, the relationship graph engine 1314 could identify a software program or application program executing on one or more client devices, where the software program or application program is a new user of PowerShell commands. In this example, a given software program or application program executing on one or more client devices is not associated with any PowerShell commands in the baseline behavior, but the newly arriving time series data indicates that the software program or application program has executed one or more PowerShell commands within the context of at least one account. In another example, and without limitation, the relationship graph engine 1314 could identify that a particular client device is a new user of PowerShell commands. In this example, the baseline behavior for all accounts associated with the client device indicates that no account on that client device has executed any PowerShell commands. However, the newly arriving time series data indicates that at least one account associated with the client device has executed a PowerShell command. The relationship graph engine 1314 transmits the results of the above analysis functions to the batch risk assessor 1316.

The batch risk assessor 1316 receives parquet table analysis results from the parquet table engine 1312. The batch risk assessor 1316 further receives relationship graph analysis results from the relationship graph engine 1314. Based on the received parquet table analysis results and relationship graph analysis results, the batch risk assessor 1316 computes a heuristic risk value that represents a risk assessment associated with the batch data. The batch risk assessor 1316 transmits the heuristic risk value to the risk scoring engine 1318.

The risk scoring engine 1318 receives a heuristic risk value that represents a risk assessment associated with the formatted and filtered streaming data from the streaming risk assessor 1308. Further, the risk scoring engine 1318 receives a heuristic risk value that represents a risk assessment associated with the batch data from the batch risk assessor 1316. The risk scoring engine 1318 computes a final heuristic risk value based on the input heuristic risk values. The risk scoring engine 1318 stores the final heuristic risk value in the data store 240. The risk scoring engine 1318 detect whether an anomaly is indicated with respect to a particular client device based on either or both of the formatted and filtered streaming data in the batch data. In some embodiments, the risk scoring engine 1318 may initiate a mitigation action with respect to the client device in response to detecting the anomaly.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In one example, and without limitation, the techniques described herein are implemented in conjunction with the system architecture described in conjunction in FIGS. 1-14. However, the described techniques could be implemented in conjunction with any technically feasible system architecture that generates the requisite raw machine data upon which the disclosed techniques are based. In particular, the security monitoring system 1116 could be implemented to receive and analyze raw machine data and/or data in any technically feasible format. Further, the security monitoring system 1116 could analyze data received from the data intake and query system 108 described in conjunction with FIGS. 1-10, from any alternative computer system capable of generating such data, or any technically feasible combination thereof.

In another example, and without limitation, certain techniques are described as being performed at the granularity of an individual account, a cluster of accounts, or a client device. However, any of the techniques described herein could be performed at any technically feasible granularity within the scope of the present disclosure.

Figure 14:
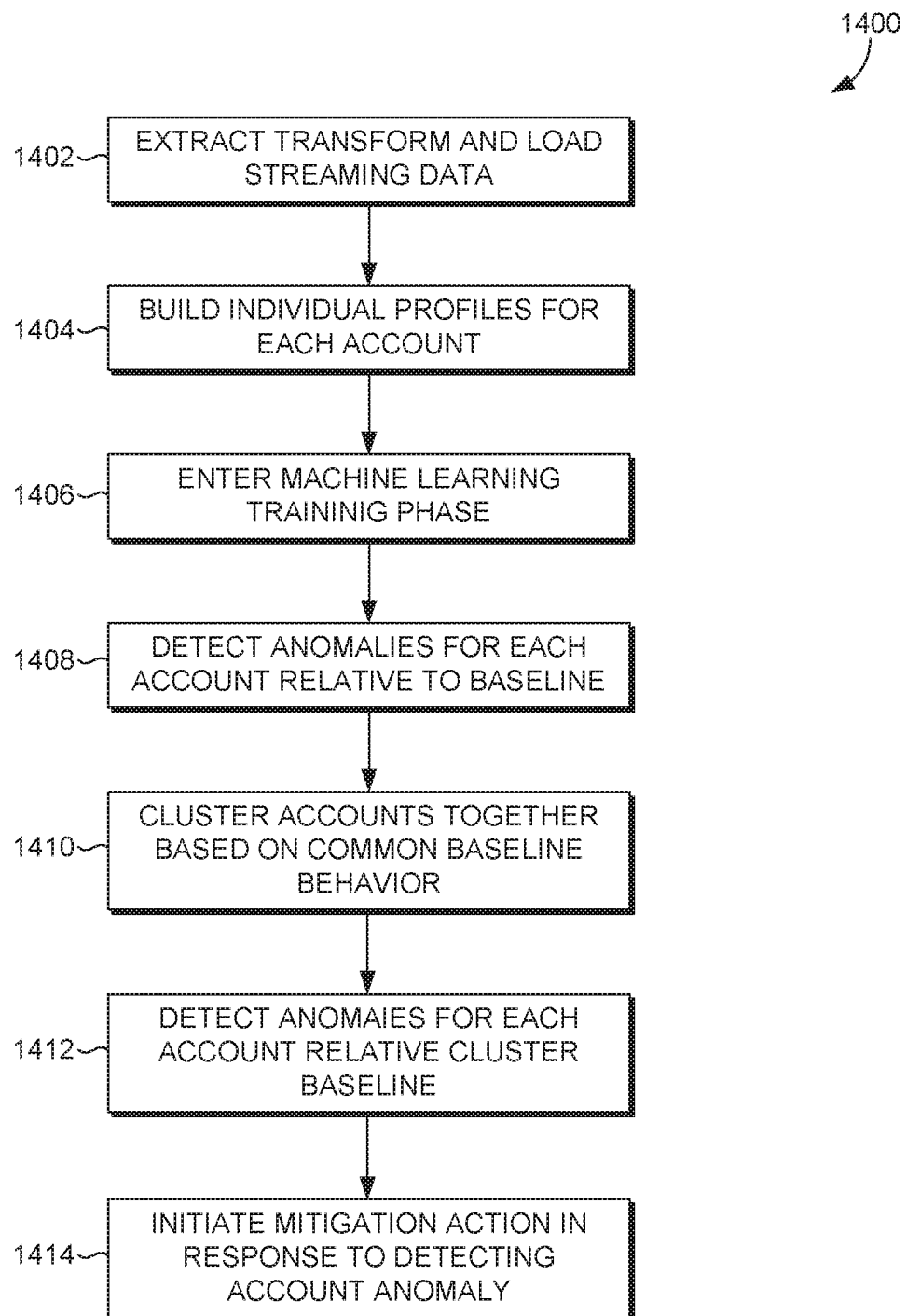
FIG. 14 is a flow diagram of method steps for identifying attack behavior based on scripting language activity in accordance with the disclosed embodiments.

FIG. 14 is a flow diagram of method steps for identifying attack behavior based on scripting language activity in accordance with the disclosed embodiments. Although the method steps are described in conjunction with the systems of FIGS. 1-2 and 10-13, persons of ordinary skill in the art will understand that any system configured to perform the method steps, in any order, is within the scope of the present invention.

As shown, a method 1400 begins at step 1402, where a real-time analyzer 1231 associated with a security monitoring system 1116 performs an extract, transform, and load (ETL) process on the incoming streaming data to generate data in a format that is amenable to further analysis by the security monitoring system 1116. The real-time analyzer 1231 receives streaming data, also referred to herein as recorded information, from one or more client devices 102 and host devices 106. The streaming data is associated with execution of commands in a scripting language, such as PowerShell. The real-time analyzer 1231 may remove or otherwise filter streaming data that is not relevant to security threat detection while retaining relevant streaming data.

At step 1404, the real-time analyzer 1231 builds individual profiles of behaviors for each account associated with a client device, referred to herein as behavior profiles, by sorting the streaming data into a separate time series for each account. The behavior profiles are based on scripting language commands included in the streaming data. Each time series includes scripting language actions associated with the device and the time associated with each scripting language action. In some embodiments, each time series may have the form (account id, (time 1, action 1), (time 2, action 2), . . . ), where "account id" is an identifier of an account associated with the client device, "time 'n'" is the time when a given action has occurred, and "action 'n'" is the action corresponding to time 'n.'

At step 1406, a batch analyzer 1232 associated with the security monitoring system 1116 enters a machine learning training mode to establish a baseline behavior for each account associated with a client device. For a given account, the batch analyzer 1232 analyzes historical data represented by the time series until enough data is analyzed to establish a reliable baseline behavior. When a reliable baseline behavior is established for a given account, the batch analyzer 1232 transitions to an anomaly detection phase for the given account.

At step 1408, the batch analyzer 1232 evaluates newly arriving time series data for an account relative to the baseline behavior for that account. Newly arriving time series data for an account that differs significantly from the baseline behavior for the account may indicate an anomaly associated with potentially malicious software. At step 1410, the batch analyzer 1232 groups accounts associated with client devices into clusters, where the accounts within a particular cluster have similar baseline behaviors. Current behavior of an account that varies sufficiently from the baseline behavior associated with the corresponding cluster indicates an anomaly associated with potentially malicious software. At step 1412, one or both of the real-time analyzer 1231 and the batch analyzer 1232 detect an anomaly associated with an account based on the current behavior of the account differing significantly from the baseline of the account. Alternatively or in addition, one or both of the real-time analyzer 1231 and the batch analyzer 1232 detect an anomaly associated with an account based on the current behavior of the account differing significantly from the baseline of the cluster to which the account belongs. At step 1414, one or both of the real-time analyzer 1231 and the batch analyzer 1232 initiate a mitigation action with respect to the account.

The method 1400 then terminates.

In sum, a security monitoring system associated with a computer network identifies attack behavior of a malicious client device based on scripting language activity, such as actions associated with the PowerShell scripting language. The security monitoring system receives streaming data from one or more client devices, where the streaming data includes information regarding scripting language commands executed by each of the client devices. The streaming data can be accessed from log files associated with client devices, packet capture data derived from message traffic over a computer network, or any other technical feasible data source. The security monitoring system builds profiles of scripting language behaviors for each individual client device.

For each client device, the security monitoring system enters a machine learning training phase to characterize a sufficient amount of historical behavior of the client device to establish a baseline behavior for the client device. When a sufficient amount of historical behavior is characterized for a particular client device, the security monitoring system enters a scoring phase for that client device. In the scoring phase, the security monitoring system computes a risk value for the current behavior of the client device compared to the baseline behavior. If the current behavior of a client device varies sufficiently from the baseline behavior, then the security monitoring system identifies that the client device is engaged an anomalous behavior. Further, the security monitoring system clusters the client devices into one or more clusters of client devices, where the client devices within a particular cluster have similar baseline behaviors. If the current behavior of a client device varies sufficiently from the baseline behavior associated with the corresponding cluster, then the security monitoring system identifies that the client device is engaged an anomalous behavior. Upon detecting anomalous behavior, the security monitoring system initiates a mitigation action with respect to the first client device.

At least one advantage of the disclosed techniques is that malicious software is detected with greater accuracy relative to prior techniques that are limited to substring searches. Behavior anomalies are detected at the granularity of the individual client device, leading to faster and earlier detection of behavior anomalies that indicated potentially malicious activity. Further, the potential for falsely identifying legitimate system administrator and super user activity as malicious behavior may be reduced relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for identifying attack behavior based on scripting language activity, comprising:
  generating a first behavior profile for a first client device based on a first set of raw machine data generated by the first client device, wherein the first behavior profile is associated with a first account of a plurality of accounts on the first client device, wherein the first behavior profile organizes the first set of raw machine data based on a first time series comprising a first one or more entries, wherein each of the first one or more entries in the first time series includes a first corresponding scripting language command included in the first set of raw machine data and a corresponding time associated with the first corresponding scripting language command, and wherein the first corresponding scripting language command is configured to be executed by the first client device;
  generating a second time series comprising a second one or more entries and based on a second set of raw machine data generated by the first client device, wherein each of the second one or more entries in the second time series includes a second corresponding scripting language command included in the second set of raw machine data and a corresponding time associated with the second corresponding scripting language command, wherein the second corresponding scripting language command is configured to be executed by the first client device;

determining a risk value for the second set of raw machine data based on differences between the first time series and the second time series;

detecting an anomaly in the second set of raw machine data based on the determined risk value; and initiating a mitigation action with respect to the first client device in response to detecting the anomaly.

2. The computer-implemented method of claim 1, wherein the first behavior profile for the first client device is further based on scripting language commands included in one or more events, each event being associated with a different timestamp and including raw machine data reflective of activity within an information technology infrastructure that includes the first client device.

3. The computer-implemented method of claim 1, further comprising maintaining a plurality of behavior profiles including the first behavior profile, wherein each behavior profile included in the plurality of behavior profiles corresponds to a different client device in a plurality of client devices that includes the first client device.

4. The computer-implemented method of claim 1, wherein determining the risk value comprises determining that the second set of raw machine data includes a scripting language command that is not Present in the first set of raw machine data.

5. The computer-implemented method of claim 1, wherein determining the risk value comprises determining that the second set of raw machine data includes at least one scripting language command and the first behavior profile does not include any scripting language commands.

6. The computer-implemented method of claim 1, wherein determining the risk value comprises determining that the first set of raw machine data indicates that an application program has not employed any scripting language commands during a first time duration, and the second set of raw machine data indicates that the application program has employed at least one scripting language command during a second time duration.

7. The computer-implemented method of claim 1, further comprising determining that the second set of raw machine data includes a command that is indicative of malicious activity.

8. The computer-implemented method of claim 1, further comprising determining that the second set of raw machine data includes data that has been obfuscated according to a first encoding schema.

9. A non-transitory computer-readable storage medium including instructions that, when executed by a processor, cause the processor to identify attack behavior based on scripting language activity, by performing the steps of:

generating a first behavior profile for a first client device based on a first set of raw machine data generated by the first client device, wherein the first behavior profile is associated with a first account of a plurality of accounts on the first client device, wherein the first behavior profile organizes the first set of raw machine data based on a first time series comprising a first one or more entries, wherein each of the first one or more entries in the first time series includes a first corresponding scripting language command included in the first set of raw machine data and a corresponding time associated with the first corresponding scripting language command, and wherein the first corresponding scripting language command is configured to be executed by the first client device;

generating a second time series comprising a second one or more entries and based on a second set of raw machine data generated by the first client device, wherein each of the second one or more entries in the second time series includes a second corresponding scripting language command included in the second set of raw machine data and a corresponding time associated with the second corresponding scripting language command, wherein the second corresponding scripting language command is configured to be executed by the first client device;

determining a risk value for the second set of raw machine data based on differences between the first time series and the second time series;

detecting an anomaly in the second set of raw machine data based on the determined risk value; and initiating a mitigation action with respect to the first client device in response to detecting the anomaly.

10. The non-transitory computer-readable storage medium of claim 9, wherein the first behavior profile for the first client device is further based on scripting language commands included in one or more events, each event being associated with a different timestamp and including raw machine data reflective of activity within an information technology infrastructure that includes the first client device.

11. The non-transitory computer-readable storage medium of claim 9, further comprising maintaining a plurality of behavior profiles including the first behavior profile, wherein each behavior profile included in the plurality of behavior profiles corresponds to a different client device in a plurality of client devices that includes the first client device.

12. The non-transitory computer-readable storage medium of claim 9, wherein determining the risk value comprises determining that the second set of raw machine data includes a scripting language command that is not Present in the first set of raw machine data.

13. The non-transitory computer-readable storage medium of claim 9, wherein determining the risk value comprises determining that the second set of raw machine data includes at least one scripting language command and the first behavior profile does not include any scripting language commands.

14. The non-transitory computer-readable storage medium of claim 9, wherein determining the risk value comprises determining that the first set of raw machine data indicates that an application program has not employed any scripting language commands during a first time duration, and the second set of raw machine data indicates that the application program has employed at least one scripting language command during a second time duration.

15. The non-transitory computer-readable storage medium of claim 9, further comprising determining that the second set of raw machine data includes a command that is indicative of malicious activity.

16. The non-transitory computer-readable storage medium of claim 9, further comprising determining that the second set of raw machine data includes data that has been obfuscated according to a first encoding schema.

17. A computing device configured to identify attack behavior based on scripting language activity, comprising:

a memory that includes a security monitoring program; and a processor that is coupled to the memory and, when executing the security monitoring program, is configured to:

generate a first behavior profile for a first client device based on a first set of raw machine data generated by the first client device, wherein the first behavior profile is associated with a first account of a plurality of accounts on the first client device, wherein the first behavior profile organizes the first set of raw machine data based on a first time series comprising a first one or more entries, wherein each of the first one or more entries in the first time series includes a first corresponding scripting language command included in the first set of raw machine data and a corresponding time associated with the first corresponding scripting language command, and wherein the first corresponding scripting language command is configured to be executed by the first client device;

generate a second time series comprising a second one or more entries and based on a second set of raw machine data generated by the first client device, wherein each of the second one or more entries in the second time series includes a second corresponding scripting language command included in the second set of raw machine data and a corresponding time associated with the second corresponding scripting language command, wherein the second corresponding scripting language command is configured to be executed by the first client device;

determine a risk value for the second set of raw machine data based on differences between the first time series and the second time series;

detect an anomaly in the second set of raw machine data based on the determined risk value; and initiate a mitigation action with respect to the first client device in response to detecting the anomaly.

18. The computing device of claim 17, wherein the first behavior profile for the first client device is further based on scripting language commands included in one or more events, each event being associated with a different timestamp and including raw machine data reflective of activity within an information technology infrastructure that includes the first client device.

19. The computing device of claim 17, further comprising maintaining a plurality of behavior profiles including the first behavior profile, wherein each behavior profile included in the plurality of behavior profiles corresponds to a different client device in a plurality of client devices that includes the first client device.

20. The computing device of claim 17, wherein determining the risk value comprises determining that the second set of raw machine data includes a scripting language command that is not Present in the first set of raw machine data.

21. The computing device of claim 17, wherein determining the risk value comprises determining that the second set of raw machine data includes at least one scripting language command and the first behavior profile does not include any scripting language commands.

22. The computing device of claim 17, wherein detecting the anomaly in the second set of raw machine data includes determining that the first set of raw machine data indicates that an application program has not employed any scripting language commands during a first time duration, and the second set of raw machine data indicates that the application program has employed at least one scripting language command during a second time duration.

23. The computing device of claim 17, further comprising determining that the second set of raw machine data includes a command that is indicative of malicious activity.

24. The computing device of claim 17, further comprising determining that the second set of raw machine data includes data that has been obfuscated according to a first encoding schema.

25. The computer-implemented method of claim 1, further comprising detecting that an account associated with the first client device is attempting to escalate a privilege level for the account, wherein initiating the mitigation action with respect to the first client device is further in response to detecting that the account is attempting to escalate the privilege level.

26. The computer-implemented method of claim 1, further comprising:

performing a lexical analysis on the second set of raw machine data; and determining an entropy value based on the lexical analysis, wherein detecting the anomaly in the second set of raw machine data is further based on the entropy value.

27. The computer-implemented method of claim 1, further comprising:

calculating a number of occurrences of a plurality of n-grams included in the second set of raw machine data; and detecting a change of at least one of the number of occurrences of the plurality of n-grams and a distribution of the plurality of n-grams, wherein detecting the anomaly in the second set of raw machine data is further based on the detecting the change.

28. The computer-implemented method of claim 1, further comprising:

detecting that the second set of raw machine data has been obfuscated according to a first encoding schema; and decoding the second set of raw machine data according to the first encoding schema.

29. The computer-implemented method of claim 1, wherein:

the second corresponding scripting language command of each of the second one or more entries in the second time series is associated with an account identifier corresponding to the first account.

30. The computer-implemented method of claim 29, wherein the first corresponding scripting language command of each of the first one or more entries in the first time series is associated with the account identifier of the first account.

31. The computer-implemented method of claim 29, wherein the first corresponding scripting language command of each of the first one or more entries in the first time series is executed by the first account on the first client device.

32. The computer-implemented method of claim 29, wherein initiating the mitigation action with respect to the first client device comprises initiating the mitigation action with respect to the first account.

33. The computer-implemented method of claim 1, further comprising:

generating a plurality of second behavior profiles for the first client device, each of the second behavior profiles being based on a corresponding set of raw machine data generated by the first client device, wherein each of the second behavior profiles is associated with a corresponding account on the first client device, each second behavior profile organizes the corresponding set of raw machine data based on a corresponding time series comprising a corresponding one or more entries, wherein each of the corresponding one or more entries in the corresponding time series includes a corresponding scripting language command included in the corresponding set of raw machine data and executed by the corresponding account and a corresponding time associated with the scripting language command, and wherein the corresponding scripting language command is configured to be executed by the corresponding account of the first client device, the plurality of second behavior profiles including the first behavior profile;

identifying the first account of the first client device associated with the second set of raw machine data based on an account identifier associated with each second corresponding scripting language command; and selecting the first behavior profile from the plurality of second behavior profiles in response to determining that the corresponding account associated with the first behavior profile is the first account.

34. The computer-implemented method of claim 1, wherein the first behavior profile is generated via a machine learning process that operates on the first set of raw machine data.

* * * * *